United States Patent [19]
Maeda et al.

[11] Patent Number: 5,303,221
[45] Date of Patent: Apr. 12, 1994

[54] OPTICAL PICKUP FOR AN OPTICAL DISC REPRODUCING SYSTEM

[75] Inventors: Takanori Maeda; Noriaki Murao, both of Saitama, Japan

[73] Assignee: Pioneer Electronic Corporation, Tokyo, Japan

[21] Appl. No.: 72,941

[22] Filed: Jun. 8, 1993

[30] Foreign Application Priority Data

Jun. 10, 1992 [JP] Japan .................................. 4-175060

[51] Int. Cl.[5] .............................................. G11B 7/08
[52] U.S. Cl. ...................................... 369/112; 369/103; 369/44.12
[58] Field of Search ............... 369/44.14, 44.21, 44.23, 369/44.37, 44.38, 103, 105, 109, 110, 116, 112; 250/201.5; 396/44.12

[56] References Cited

U.S. PATENT DOCUMENTS 5,208,801   6/1993   Finegan ..................... 369/44.14

Primary Examiner—Paul M. Dzierzynski
Assistant Examiner—Don Wong
Attorney, Agent, or Firm—Nikaido, Marmelstein, Murray & Oram

[57] ABSTRACT

An optical pickup has a light source for generating a first light having a longer wavelength and a second light having a shorter wavelength, an objective, and a phase hologram disposed between the light source and the objective. The objective is designed to have a larger spherical aberration for the first light than a spherical aberration for the second light. The phase hologram is arranged to give a phase difference of an integer multiple of $2\pi$ for the second light. The phase hologram is further arranged so that a spherical aberration given to the first light has an opposite polarity to the polarity of the spherical aberration given by the objective.

1 Claim, 2 Drawing Sheets

OPTICAL PICKUP FOR AN OPTICAL DISC REPRODUCING SYSTEM

BACKGROUND OF THE INVENTION

The present invention relates to an pickup for an optical disc reproducing system, and more particularly to a pickup where a light source emits different laser beams, each having a different wavelength for reproducing information on different optical discs, each having different recording densities.

In order to improve efficiency of recording and reproducing information on the optical disc, an optical disc having a high recording density is proposed. To read such a disc, an optical pickup having a second harmonics generating device or a laser device which emits a beam of a short wavelength such as green light or blue light has been developed.

The pickup having the laser device emitting the beam of the short wavelength reads information recorded in high recording density with accuracy.

Conventionally, a disc having information of a low recording density such as a laser disc or a CD is reproduced by a beam of a long wavelength such as infrared rays.

It is desirable that the pickup can read both the high density disc and the conventional disc.

However, the beam of the short wavelength is radiated on the disc at a small spot diameter for reproducing the information in the high recording density. Therefore, if the short wavelength of the blue light is used for the disc of the low recording density, the spot diameter is too small for the pit on the disc and a phase difference dependent on the depth of the pit is different in wavelength. Accordingly, the level of the reproduced signal is low and signal distortion is increased. Therefore, it is difficult to obtain a good reproduction.

In order to solve such a problem, there has been proposed to provide a pickup having two laser beam sources for emitting laser beams having different wavelengths.

In particular, if the second harmonics generating device (SHG) comprising a laser device and a resonator is used, beams of long wavelength and short wavelength can be obtained.

FIG. 3 shows a conventional pickup having a second harmonics generating device. The second harmonics generating device comprises a semiconductor laser device 1 for emitting a beam of infrared rays and a nonlinear optical resonator 2 for producing a blue beam of a half wavelength of the infrared rays. Laser beams of the infrared rays emitted from the laser device 1 are fed to the nonlinear resonator 2. The nonlinear resonator 2 operates to convert a part of the beams into a beam of a blue light having short wavelength. The beams of the infrared rays and the blue light are reflected on a beam splitter 3 where the beams are changed in a perpendicular direction. The beams from the beam splitter 3 are arranged to parallel beams through a collimator lens 4 and fed to an objective 5. The beams are focused on a recording surface of an optical disc 6 by the objective 5.

The reflected beams from the optical disc 6 are reflected on a dichroic mirror 7 passing through the objective 5, collimator lens 4 and beam splitter 3, where the beams are divided into short wavelength and long wavelength. The beams of the blue light of the short wavelength are focused on a photodetector 8 on which divided photo-sensors are provided. The beams of the infrared rays of the long wavelength are focused on a photodetector 9 on which divided photo-sensors are provided. Thus, the photodetector 8 detects information on a disc having a high recording density and the photodetector 9 detects information on a disc having a low recording density. In the photodetector, a focus error is detected by the astigmatic method and a tracking error is detected by a push-pull method. Thus, the pickup having compatibility is obtained.

In such a pickup, it is necessary to provide the collimator lens 4 and the objective 5 so as to have a diffraction limited performance at the two wavelengths. Namely, both lens must be arranged to have small chromatic aberration. However, it is difficult to make a lens by molding plastic to have diffraction limited performance for two wavelengths. Therefore the objective 5 must be made of three lenses. It is possible to use different collimator lenses in accordance with the wavelength of the beam. However, in order to cooperate with the objective 5, the collimator lens 4 becomes large in size. Accordingly, the lenses are complicated in construction, thereby increasing manufacturing cost, and an actuator for operating the objective 5 becomes large, which causes an increase of power consumption.

Furthermore, since the photodetectors are individually provided, it is necessary to adjust positions thereof with accuracy when assembling, causing troublesome assembling.

SUMMARY OF THE INVENTION

An object of the present invention is to provide an optical pickup which is simple in construction, thereby reducing the manufacturing cost.

Another object of the present invention is to provide a pickup which may reproduce information on optical discs having different recording densities.

According to the present invention, there is provided an optical pickup for an optical disc reproducing system, comprising a light source for generating a first light having a longer wavelength and a second light having a shorter wavelength, a focusing lens assembly for focusing the first and second lights on the optical disc, respectively, and a phase hologram disposed between the light source and the focusing lens assembly.

The focusing lens assembly is designed to have a larger spherical aberration coefficient for the first light than a spherical aberration coefficient for the second light.

The phase hologram is designed to give a phase difference of an integer multiple of $2\pi$ for the second light, and designed such that a spherical aberration coefficient given to the first light has an opposite polarity to the polarity of the spherical aberration coefficient given by the focusing lens assembly.

The other objects and features of this invention will become understood from the following description with reference to the accompanying drawings.

DETAILED DESCRIPTION OF THE PREFERRED EMBODIMENTS

Figure 1:
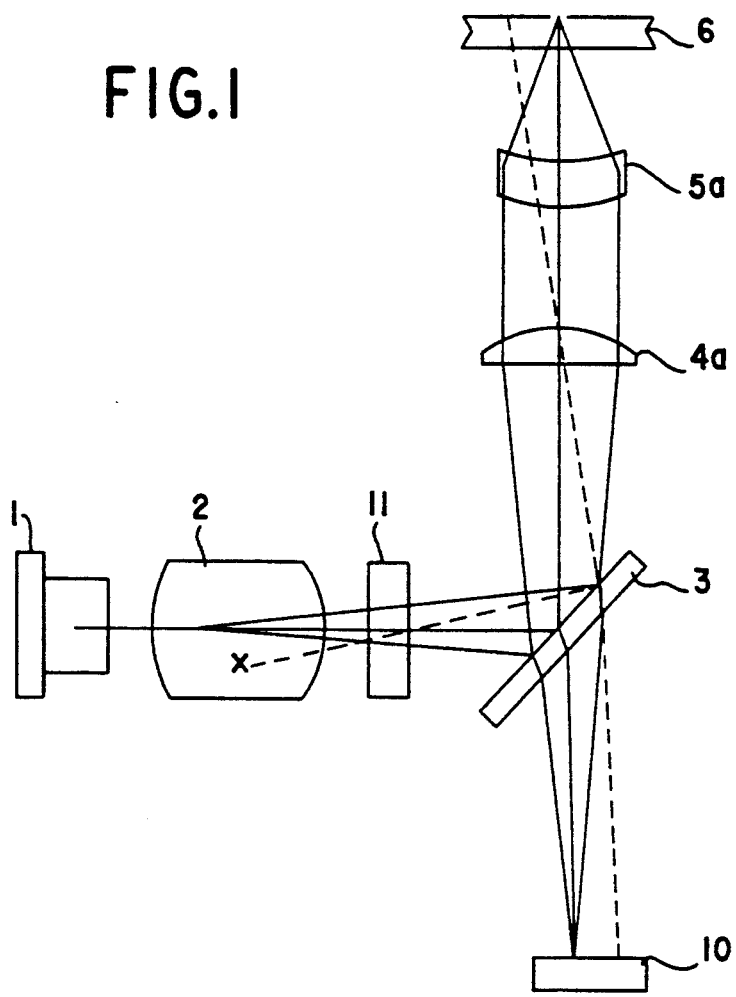
FIG. 1 schematically shows an optical pickup for an optical disc reproducing system according to the present invention.
Figure 3:
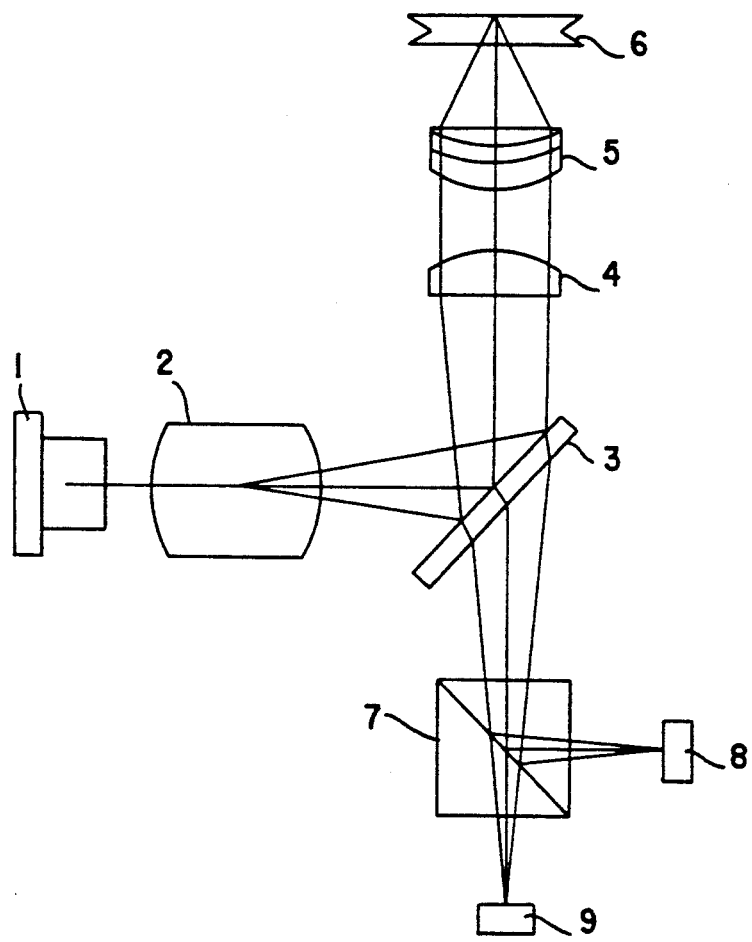
FIG. 3 schematically shows a conventional optical pickup.

Referring to FIG. 1 showing an optical pickup according to the present invention, structures which are the same as the conventional one are identified with the same reference numerals as FIG. 3.

The semiconductor laser device 1 emits the beams of the infrared rays having the wavelength of 860 nm. The nonlinear optical resonator 2 converts a part of the incident beams into the beams of the blue light having the wavelength of 430 nm.

The beams are fed to a phase hologram 11 provided between the nonlinear resonator 2 and the beam splitter 3.

The beams are further fed to the optical disc 6 through the beam splitter 3 and a collimator lens 4a and focused thereon by an objective 5a. Each of the collimator lens and the objective is designed to have a minimum aberration for the blue light.

Figure 2:
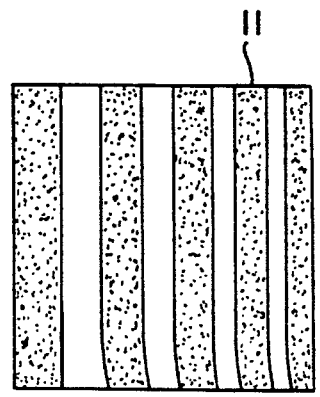
FIG. 2 shows a pattern of a hologram element in the pickup.

FIG. 2 shows a pattern of the phase hologram 11. The pattern comprises black and white stripes. However, actually there is no black stripes. The black stripes are used for depicting the thickness difference between the black and white stripes.

The nonlinear resonator produces the second harmonics of blue light having the phase difference of $2\pi$, while the infrared light has the phase difference of $\pi$. The phase hologram 11 has a cyclic structure in accordance with phase difference.

The phase hologram has a recorded data which is formed to convert the beam passing therethrough so as to have a wave front which operates to correct the chromatic aberration and the aberration caused by the image height of the collimator lens 4a and the objective 5a.

The phase hologram 11 is arranged such that the phase difference for the incident beams of the blue light having a short wavelength $\lambda 1$ becomes an integer multiple of $2\pi$ ($2 m\pi$ m is a positive integer). Thus, no phase difference is given to the blue light. To the contrary, since the phase difference of the incident beams of the infrared rays having a long wavelength $\lambda 2$ is $\pi$, the infrared rays are caused to have the data of the wave front of the phase hologram 11 so as to correct the aberration of the lenses. Since the spherical aberration of the objective 5a increases with increase of the wavelength of the beam, the phase hologram 11 is arranged to give a negative spherical aberration to the infrared rays.

Thus, the beams of the blue light are focused on the disc 6 at a predetermined spot diameter of the designed diffraction limited performance, because the wave front of the blue light is not converted by the phase hologram 11. The beams of the infrared rays are focused on the disc also at a desired spot diameter of the diffraction limited performance because of the aberration correction at the phase hologram 11.

In the aberration, defocusing represented by W20 may be included. The defocusing W20 is corrected by a difference between the wavelengths at the position of the light source. Alternatively, if a desired servo point is changed, it is not necessary to correct the defocusing.

The reflected beams from the optical disc 6 are focused on a photodetector 10 passing through the objective 5a, collimator lens 4a and beam splitter 3.

A virtual image of the light source of the infrared rays is positioned at a point x in the resonator 2 by the phase hologram 11. Accordingly, the position of the image on the photodetector 10 changes with the wavelength.

The focus error and the tracking error can be detected by the astigmatic method and the push-pull method in the same manner as the conventional pickup. The spot of the blue light may be used only to read a signal and the spot of the infrared rays focused at a predetermined position with respect to the spot of the blue light may be used to obtain a servo signal.

In the embodiment, in place of the second harmonics generating device, other nonlinear optical device such as a sum generating device or a pair of light sources having a different wavelength can be used.

If two light sources are used, the position of the light source is different from each other in dependency on the wavelength of the light. The hologram 11 can be also used for correcting the aberration caused by the image height of the lens.

Although the tracking error is detected by the push-pull method in the embodiment described above, other methods such as the time difference method and the heterodyne method may be employed. The focus error may be detected by the knife edge method, Foucault prism method or the critical angle method.

The present invention may be adapted for playing various optical recording medium such as a read-only disc having a plurality of pits, a rewritable disc wherein reflectance is controlled to rewrite data, and a magneto-optical writable disc. The recording medium may even be an optical card, in which case focusing operation becomes unnecessary.

In accordance with the present invention, the pickup is provided with a hologram as a phase diffraction grating for correcting the chromatic aberration of the lens. Therefore, an objective having a simple structure can be used. Furthermore, the dichroic mirror used in the conventional system is omitted and one photodetector is provided. Since the positions of spots on the photodetector can be changed with the wavelength, it is not necessary to provide a wavelength dividing element which is used in the conventional system. Accordingly, the photodetector can be easily adjusted.

While the presently preferred embodiments of the present invention have been shown and described, it is to be understood that these disclosures are for the purpose of illustration and that various changed and modifications may be made without departing from the scope of the invention as set forth in the appended claims.

What is claimed is:

1. An optical pickup for an optical disc reproducing system, comprising a light source for generating a first light having a first wavelength and a second light having a second wavelength; wherein the first wavelength is longer than the second wavelength, a focusing lens assembly for focusing the first and second lights on the optical disc, respectively, and a phase hologram disposed between the light source and the focusing lens assembly; wherein the focusing lens assembly has a spherical aberration coefficient for the first light larger than a spherical aberration coefficient for the second light; and the phase hologram corrects a phase difference of the second light by providing a phase difference of an integer multiple of $2\pi$ to the phase difference of the second light, and corrects a spherical aberration coefficient of the first light by providing the spherical aberration coefficient of the first light an opposite polarity to a polarity of the spherical aberration coefficient of the focusing lens assembly.

* * * * *